(No Model.)
H. OLSON & J. HOGLAND.
CORNSTALK CUTTER.
No. 335,949. Patented Feb. 9, 1886.
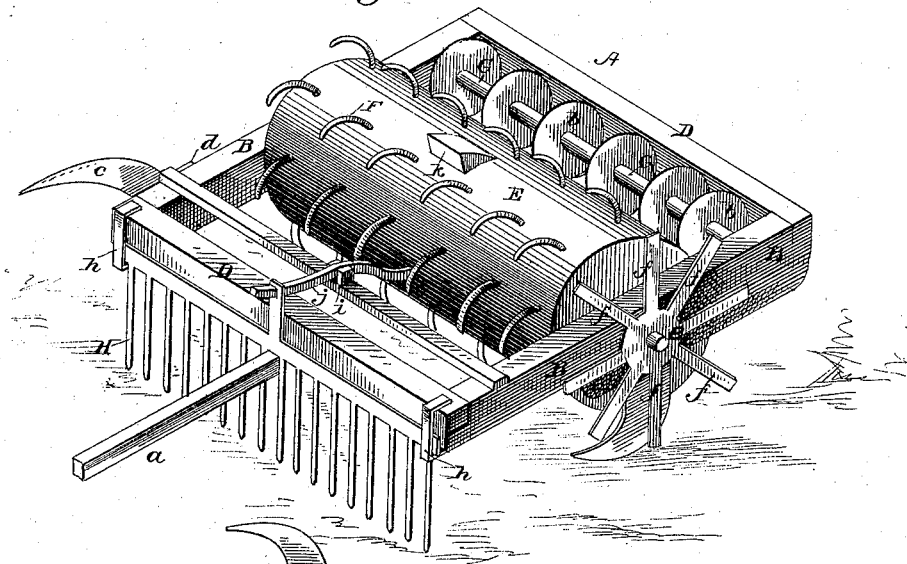
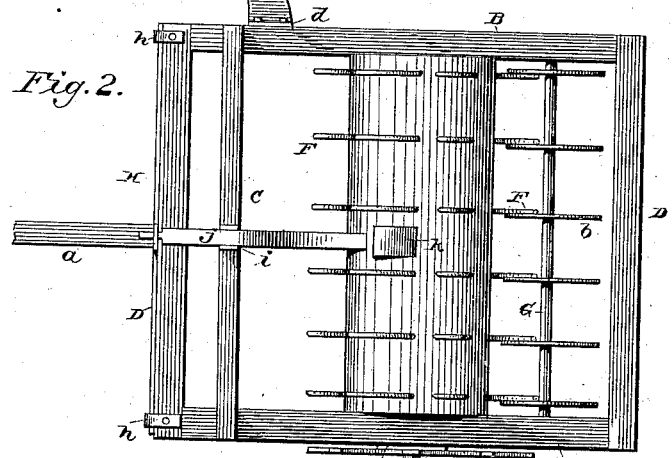
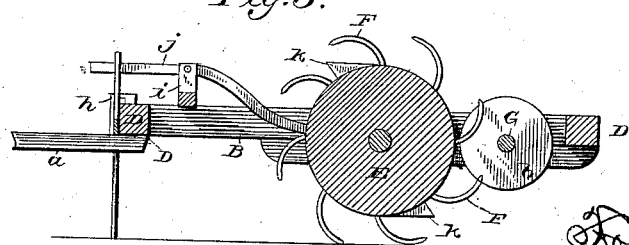

UNITED STATES PATENT OFFICE.

HOLCOM OLSON AND JOHN HOGLAND, OF KANSAS CITY, MISSOURI.

CORNSTALK-CUTTER.

SPECIFICATION forming part of Letters Patent No. 335,949, dated February 9, 1886.

Application filed August 13, 1885. Serial No. 174,328. (No model.)

*To all whom it may concern:*

Be it known that we, HOLCOM OLSON and JOHN HOGLAND, citizens of the United States, residing at Kansas City, in the county of Jackson and State of Missouri, have invented certain new and useful Improvements in Cornstalk-Cutters; and we do hereby declare the following to be a full, clear, and exact description of the invention, such as will enable others skilled in the art to which it appertains to make and use the same.

Our invention relates to cornstalk-cutting machines, the object being to provide a knife or cutter adapted to come in contact with and cut the nearest row of standing stalks, while the stalks that have already been harvested are being cut in small pieces; to provide a revolving shaft having a series of fingers or arms, and a revolving shaft carrying a series of circular cutting-disks, and arranged in rear of the fingers or arms, whereby the stalks will be raised by the arms and carried to the cutters, and there divided into desired lengths; to provide a revolving-arm wheel, and a stationary cutter adjacent thereto, whereby the ends of the stalks will be cut as they are carried to the revolving cutters, and to provide a rake adapted to gather the stalks, and to be raised and lowered at intervals to allow the stalks to be picked up by the arms or fingers.

With the above and other objects in view the invention consists in the improved construction and combinations of parts hereinafter fully described, and pointed out in the claims.

In the drawings, Figure 1 is a perspective view of a cornstalk-cutter embodying our invention. Fig. 2 is a plan view of the same. Fig. 3 is a longitudinal vertical section.

Corresponding parts in the several figures are denoted by the same letters of reference.

Referring to the drawings, A represents a supporting-frame, which is composed of the side beams, B, connected at their ends by end beams, D.

Projecting from the front end beam, D, is a pole, *a*, to which the draft-animals may be attached.

Journaled in the side beams, B, about midway the ends thereof, is a large shaft or roller, E, secured to which in parallel rows are gathering arms or fingers F, which arms or fingers are curved so that as the machine moves forward the stalks will be picked up by said arms.

The large shaft or roller may be of wood or metal, and the arms or fingers are preferably of steel.

In the side beams, B, is journaled a shaft, G, which is located in the rear of the shaft or roller E, and secured upon said shaft are a series of circular cutting disks or wheels, *b*. These disks or wheels are revolved by the action of the metal arms or fingers, which, as they revolve with the roller E, come in contact with said knives or disks, and thus serve to rotate them. If desired, a beam provided with stationary knives might be employed, but the construction before described is preferable.

Upon one side of the frame, near the front end thereof, is provided a cutting-knife *c*, which is of substantially the same form as a sickle—that is, having a curved cutting-edge. The inner end of this cutting-knife is provided with an angular extension, *d*, by which it is secured to the frame. Upon the opposite side of the frame is mounted on the axle of the shaft or roller E a wheel, *e*, which is provided with a series of radially-projecting arms, *f*.

Secured to and depending from the frame A, adjacent to the wheel *e*, is a cutting-knife, *g*, which serves to cut the ends of the stalks as they are carried to the revolving cutters by the arms or fingers on the roller E, the ends of the stalks projecting slightly beyond the cutter, and being forced into contact therewith by the arms on the wheel *e*. At the front end of the frame is provided a rake, H, which slides in brackets *h*, and which when lowered has the ends of its teeth resting on the ground.

Just in rear of the beam D is a beam, C, upon the upper side of which is provided a bracket, *i*, in which is pivoted an arm, *j*, the outer or forward end of which is pivotally connected with the rake-head.

Upon the roller E, in a line with the arm or lever *j*, are arranged at suitable intervals a series of blocks, *k*, having beveled or slanting faces. The end of the arm or lever *j* projects rearwardly adjacent to the roller E, so that as the same revolves the blocks *k* will come in contact or engagement with the rear end of the arm or lever J and depress the inner end of the same, thus raising the rake, which will, as soon as the block struck has been passed, drop. By this construction the stalks are gathered and the rake lifted at predetermined intervals to allow the stalks to pass to the fingers. There may be as many blocks upon the roller E as necessary, so that the rake may be raised and lowered as many times as is necessary to each revolution of the large shaft or roller.

From the above description, taken in connection with the drawings, it will be seen that the stalks are cut or harvested, gathered, their ends cut off, and the stalks severed into desired lengths all at one operation, and by a machine which is simple in its construction, not likely to get out of order, and one that requires no skilled attention, all its operations being automatic.

Having thus described our invention, we claim—

1. In a cornstalk-cutter, the combination, with a frame, of a revolving shaft or roller, a series of curved arms or fingers attached to said roller, a shaft in rear of the roller, and a series of circular cutting wheels or disks on said shaft, said wheels or disks being revolved by contact with the arms or fingers, substantially as set forth.

2. In a cornstalk-cutting machine, the combination, with a frame, of a revolving roller having a series of gathering arms or fingers, a series of rotary cutting-knives, and a rake at the front of the frame adapted to be automatically raised and lowered at intervals, for the purpose set forth, substantially as described.

3. In a cornstalk-cutting machine, the combination, with a frame, of a revolving roller having gathering-fingers, and a series of blocks with beveled faces secured to said roller, a series of rotary cutters, a rake attached to the front of the frame, so that it may move vertically, and a pivoted arm connected with said rake and adapted to be struck by said blocks, substantially as set forth.

4. In a cornstalk-cutting machine, the combination, with a frame, of a revolving roller having a series of curved fingers, a series of circular disks adapted to be revolved by said fingers, a wheel on the axle of the roller, and having a series of arms and a depending cutting-knife, substantially as set forth.

In testimony whereof we affix our signatures in presence of two witnesses.

HOLCOM OLSON.
      JOHN HOGLAND.

Witnesses:
 C. B. PLATT,
 J. S. HARRISON.